May 17, 1966 C. A. G. LEMAY ET AL 3,252,140

CHARACTER RECOGNITION DEVICE EMPLOYING PATTERN FEATURE CORRELATION

Filed Dec. 26, 1962 4 Sheets-Sheet 1

3,252,140

CHARACTER RECOGNITION DEVICE EMPLOYING PATTERN FEATURE CORRELATION

Christopher Archibald Gordon Lemay, 15 The Close, Isleworth, Middlesex, England, and William Ellis Ingham, 27 Selby Road, Ealing, London W. 5, England Filed Dec. 26, 1962, Ser. No. 247,156
Claims priority, application Great Britain, Jan. 5, 1962, 531/62; Jan. 11, 1962, 1,043/62; Nov. 28, 1962, 44,913/62
26 Claims. (Cl. 340—146.3)

This invention relates to pattern recognition devices.

It has been proposed to provide pattern recognition devices in which an unknown pattern is compared with stored master patterns.

The comparisons may be performed by projecting each unknown pattern in turn against optical masks corresponding to the stored master patterns and measuring the light passing through each mask. The identity of the unknown pattern is determined by noting which master gives the best fit. Optical matching techniques of the kind referred to above use one separate mask for each character, although the use of both positive and negative masks has also been considered. However, according to such prior proposals, each mask forms a virtually complete image of a character, and at least one such mask is provided for each character. In certain circumstances, recognition devices employing such a matching technique have a number of disadvantages. For example, pattern recognition devices using a single mask for each character have low discriminating powers because they observe only either the presence of a character or the absence of a character. If both "positive" and "negative" masks are used for each character this disadvantage is reduced but twice as many channels are required and the outputs tend to differ by relatively small fractions of the total signal. Pattern recognition devices according to either of the above are also very liable to error, unless the effective gain of all channels is held constant.

It is an object of the present invention to provide improved pattern recognition devices wherein at least some of the difficulties indicated above are substantially reduced.

According to the present invention there is provided a pattern recognition device comprising sensing means for producing from a pattern area a series of pattern feature correlation signals which represent respectively the degree of correlation of a pattern in said area with a series of pattern features, means for producing the effect of displacement of the pattern area relative to each of said series of features, comparison devices for combining said correlation signals in different combinations to produce corresponding comparison signals, coupling means for applying the pattern feature correlation signals to the said comparison devices and output means for detecting which combination of pattern feature correlation signals has produced the extreme value of said comparison signals after a predetermined amount of relative displacement, thereby to indicate which combination of said pattern features is most nearly exhibited by the pattern in said area in different positions thereof relative to said features.

Figures 1, 4:
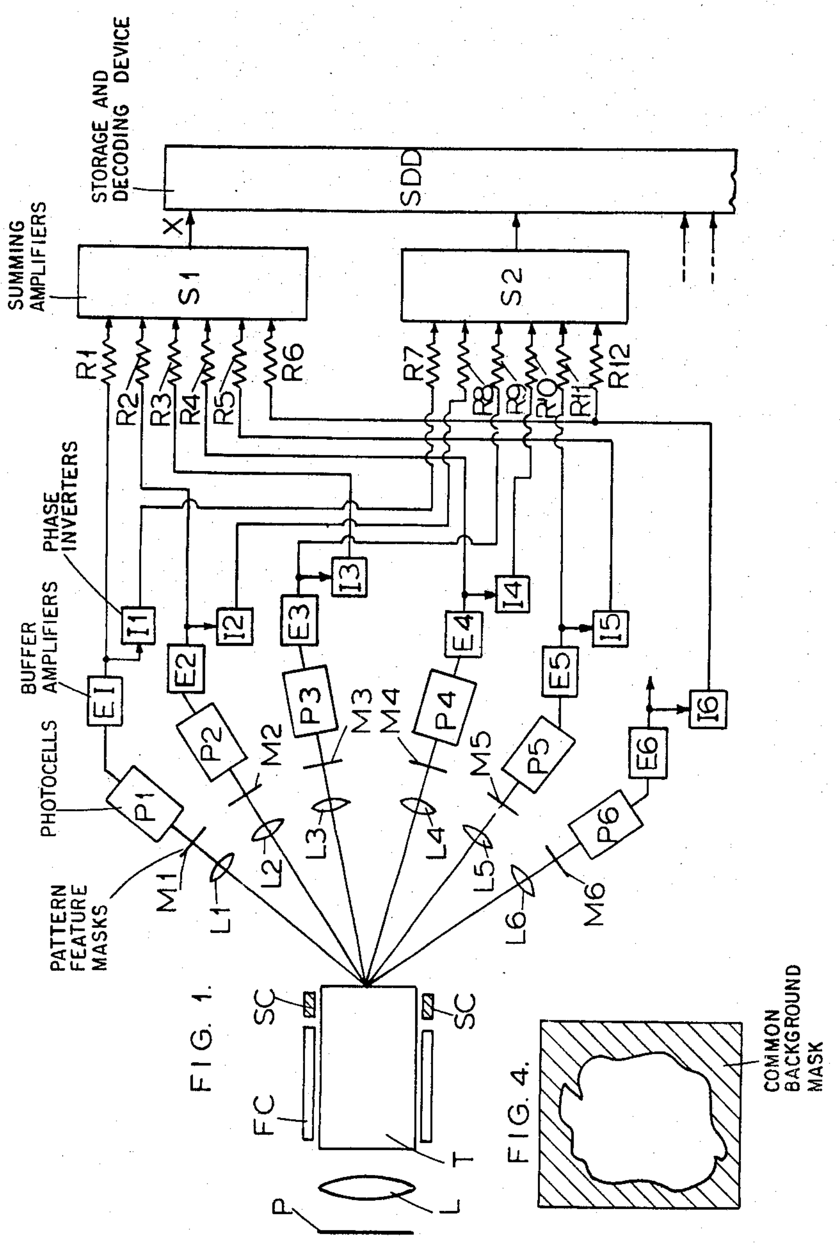

In order that the present invention may be clearly understood and readily carried into effect, it will now be described with reference to the accompanying drawings of which:

FIGURE 1 shows in block schematic form apparatus forming part of a pattern recognition device according to one example of the present invention.

Figure 2:
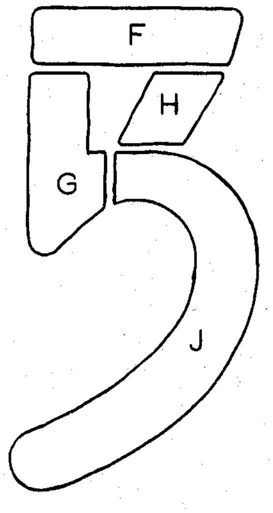
Figure 6:
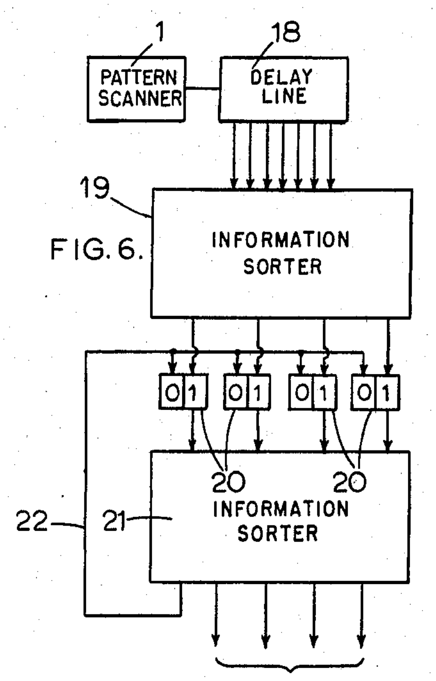
Figure 3:
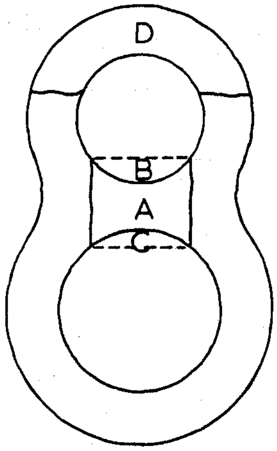
Figure 7:
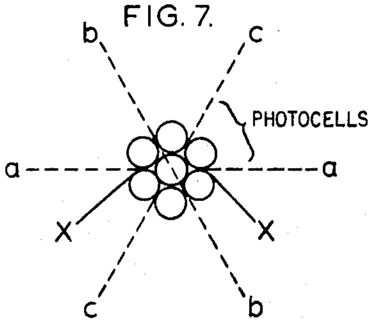
Figure 5:
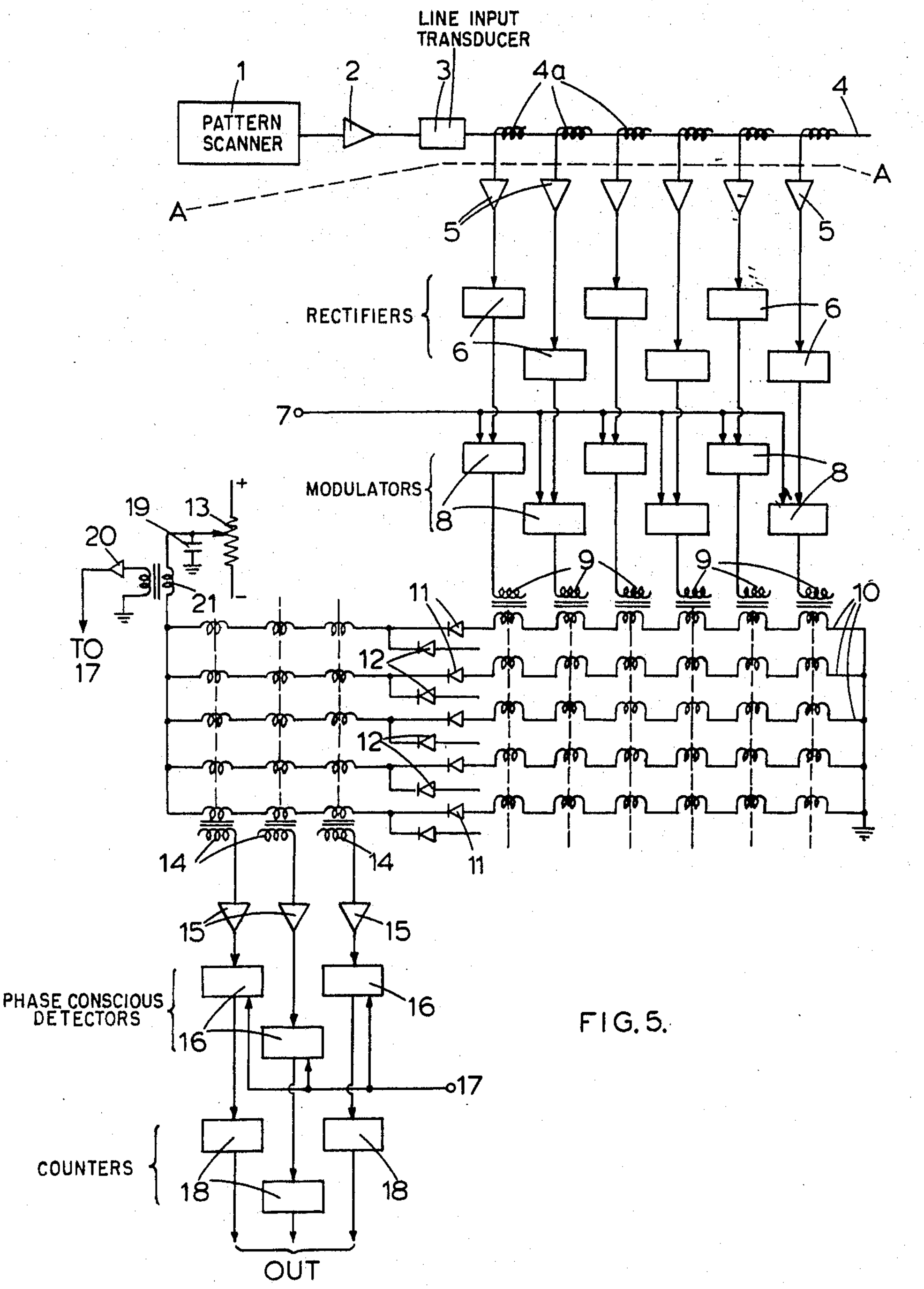

FIGURES 2 and 3, respectively, show representations of character features which will be used to explain the operation of the pattern recognition apparatus illustrated in FIGURE 1, FIGURE 4 shows a common background mask for use with FIGURE 1, FIGURE 5 shows a schematic representation of one example of part of a single stage pattern recognition device according to a further embodiment of the present invention, FIGURE 6 shows schematically a multiple-stage pattern recognition device in accordance with FIGURE 5, FIGURE 7 shows a suitable arrangement of photoelectric cells for pattern sensing which may be used to provide an input for a pattern recognition device in accordance with the embodiment of the present invention shown in FIGURE 5.

Figure 8:
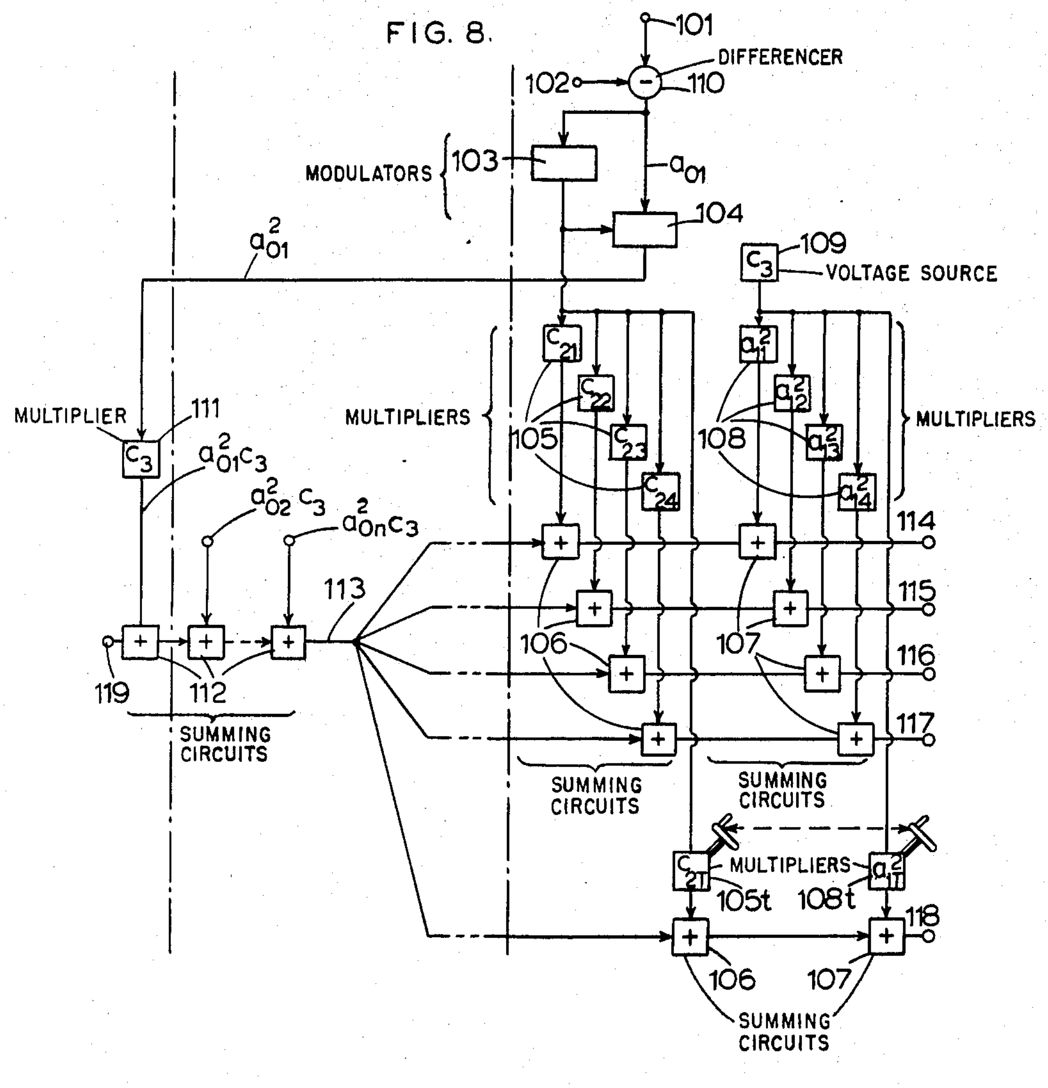

FIGURE 8 shows an alternative arrangement of a pattern recognition device based upon the embodiment shown in FIGURE 5 using analogue techniques.

In the pattern recognition device to be described with reference to FIGURE 1 of the drawings, the information about each character is not contained on separate masks but each mask contains only a representation of a feature which may be present in one or more characters. Different characters are thus represented by different groups of features, a particular feature being, for example, used in the recognition of more than one character.

In the pattern recognition apparatus shown in FIGURE 1 only six masks M1 to M6 and six photocells P1 to P6 are shown, although many more such masks and associated photocells are employed. Two summing amplifiers S1 and S2 are shown, one for each of the output channels X and Y which correspond respectively to two of the characters of the group of character patterns which are to be identified by the apparatus, although larger numbers of such channels are employed in practice.

The patterns to be recognised are carried on a support P which moves relatively slowly in a direction at right angles to the plane of the paper. An image of each of the patterns in turn is focussed by means of a lens L onto an image converter tube T equipped with normal focussing coils F.C., but also provided with deflecting coils S.C. which shift the image on the output screen of the tube T relatively rapidly upwards and downwards in a vertical direction. An image of the screen of the tube is projected through the feature masks M1 to M6 by means of the respective lenses L1 to L6 onto photocells P1 to P6, and by reason of the scanning in the tube T, the images of the pattern to be recognised are moved about relative to the masks M1 to M6. The lenses are shown at exaggerated angles to the tube T for clarity in the drawings, but would normally be located closer to the axis of the tube T. Correction in the lenses L1 to L6 for distortion due to off-axis operation is nonetheless advisable. The arrangement of an image intensifier or image converter tube and lenses is not essential, and other arrangements may be used. For example, a rotating mirror polygon co-operating with half-silvered mirrors produces satisfactory results. Also for slow speed work it is sufficient to vibrate the lens L vertically and omit the tube T altogether.

The outputs from the photocells P1 to P6 are applied to emitter followers or cathode followers E1 to E6 to permit low impedance input signals to the summing amplifiers S1 and S2, and to inverters I1 to I6 which also have low impedance outputs, so that alternative low impedance outputs of opposite phase are available from each photocell P1 to P6. The feed resistances R1 to R12 inclusive are dimensioned to equalise the outputs from the photo-multipliers in view of the fact that the signals derived therefrom are dependent upon the area of the features in the masks M1 to M6. Thus, if the outputs of a large area mask and a small area mask are not equalised, then automatically the signal from the large area mask when not occupied by a feature and given negative significance will have greater effect upon the final output of the summing amplifier than a similar output from the small area mask.

As aforesaid, the masks M1 to M6 do not, in general, carry images of whole characters but of features. Some of the features may be in the form of anti-correlation features, that is, they may represent areas which no part of a particular character should occupy. The outputs of the photocells P1 to P6 are combined in various combinations by means of summing amplifiers such as S1 and S2. Thus, the signal corresponding to the channel X is made up of the output of photocells P1, P2 and P4, which together form a measure of the positive correlation and the output of P3, P5 and P6 which provide a measure of negative correlation. The outputs from these photocells are combined by adding in amplifier S1 the outputs of P1, P2 and P4 and the negatives of the outputs of P3, P5 and P6, the negatives being produced by the phase-inverters I, the positive and inverse signals being summed in one stage. Other circuits for producing the same result may alternatively be used. The output signal from other channels, such as Y, are built up from signals derived from other combinations of the sub-masks M1 to M6. It is not necessary, of course, for each channel to use all of the sub-masks, since some of the features represented by the masks may not have significance in some of the characters of the group.

It will be appreciated that in the arrangement described above, none of the masks completely represents the given character, since the latter represent only features of a character which have to be combined to form a complete character. However, the number of masks employed to represent individual features of the characters can be reduced by delaying the signal derived from a feature mask which represents a feature of the character which is duplicated. Thus, for example, the character E comprises three horizontal bar features which occur at the top, middle and bottom of the character. In an arrangement in which the image of a character E is scanned across the mask representing features of a predetermined character, a single feature mask representing one of the horizontal bar features of the E can be employed, two of the signals derived from such a mask being delayed before they are applied to the summing amplifier S by time intervals which are respectively equal to the times taken to scan between the top and the middle and between the top and the bottom of the character. A mask-plus-photomultiplier arrangement is not used exclusively for only one character, since often the element represented by such member is common to several characters.

By way of illustration, FIGURE 2 shows a simplified diagram in which four elemental masks are combined to give the numerals "5" and "3." In this example 5 consists of (F+G+J) with H not filled, say (F+G+J−H), whilst 3 is made up of (F+H+J−G). Other areas could, of course, be used, for example the background not occupied by either character.

When larger numbers of patterns are considered, such as the digits 0–9, it is found that the elemental features or shapes are, in general, smaller and more distributed than in the simplified illustration. Thus, the "background" or anti-correlation features for any given character can be built up fairly completely from positive features of other characters. Whereas, in the example illustrated in FIGURE 2, area G is an anti-correlation feature of a "three" such an area may be covered by a plurality of features positive or negative used for other characters in the range 0 to 9. In a similar way, feature F may be used to identify the top bar of a "seven" and feature G can be utilised as an anti-correlation feature of a "seven," since it represents a space not occupied by the ink used to print a "seven."

The analogue addition of the output signals provided by the photocells can be obtained by means of an arrangement of summing resistors, or the output signals can be added by means of transformers, or any other suitable method can be employed.

Once the analogue outputs representing the match of each whole pattern have been produced these are treated as if they had been derived from an optical matching process employing masks to represent whole characters.

Thus the outputs from the amplifiers S1 and S2 together with the outputs from all other summing amplifiers are applied to a storage and decoding device SDD which identifies the character being sensed at a particular time by detecting which of the outputs from the amplifiers S attains the greatest value at any time during the sensing process, thereby detecting the greatest number of correspondences between the signals from the photocells and the series of arrangements of pattern features represented by the series of arrangements of resistors R and inverters I. The storage facilities in the device SDD are required because the output of each amplifier S is liable to vary while the image of a particular pattern is being dodged relative to the feature masks M. The storage facilities include peak detecting means to respond to the highest output of the amplifier S. The device SDD may be of any suitable construction but that described in the U.S. application Serial No. 247,157 to W. E. Ingham is preferred.

A preferred method of dividing a character into elemental features to produce the feature masks will now be described.

According to this method, features are selected by starting with the characters in the group to be identified that are most alike. These characters are then compared and common areas and exclusive areas outlined for example as shown in FIGURE 2. The next most similar character to those already chosen is then considered, the procedure repeated. The adoption of this approach results in preference being given to the characters that are the most difficult to separate. Therefore, these latter characters are represented fairly exactly by combinations of the feature masks, whereas the subsequent characters in the group will tend to be represented only approximately, since they may not fit so exactly to features already chosen for other characters.

The process outline above can be modified slightly, since it may be found that several groups of similar patterns or characters can be formed. If so, each of these groups of similar patterns forms a separate entry point in the build up of elementary areas. Thus, for example, features of the character numerals 3 and 5 can be selected first, subsequently features of the next group of most similar characters, say 1 and 7, can be selected. This modified procedure enables very similar characters which are relatively hard to separate, to receive preference against very different characters which are relatively easy to separate. According to this procedure, sparation between characters in a sub-group of similar characters may, as will be shown later, involve exact choice of sub-areas giving fairly complete coverage of the area occupied by a character and the use of decision areas, whereas separation between groups of characters can be more crudely performed. The result is however that the effective discrimination between any pair of characters in the group tends to be uniform. Alternatively, the process of selecting the elemental feature masks may begin by selecting portions of the background of the characters rather than features of the characters themselves. These two processes can be combined.

Pattern recognition apparatus, such as has been described above, provides a number of advantages. For example, the signal for any given character is not derived from one mask channel but from several channels so that changes in the gain of apparatus associated with any one channel is of less consequence. Further, if the masks are actually common to two or more channels then changes of gain are even less serious because the effects tend to cancel.

In another example of the present invention the signals having a negative significance are derived from a single mask which represents the common background to the characters. The common background mask can be a clear rectangle but preferably the outlines of such a mask are formed by superimposing the various characters of a group of characters, a typical composite shape being shown in FIGURE 4. This shape need not be limited exactly to the common area and can often with advantage be slightly larger but its shape will be determined by the general form of such an area. In such an arrangement, the elemental features of a character are used to form the masks which provide the signal having positive signficance, for example as shown in FIGURE 2 where F, G, H and J would be transparent or translucent. Alternatively, a common character mask can be obtained by superimposing the characters of a group, and the individual elemental masks can be made to represent elements of the background of a character. In determining the outlines of the common character background mask, the fact that numerals can be displaced relatively to each other can be taken into account. For example, consider the numerals 6 and 9. It may be that if a shifted 6 is compared with a 9 substantial agreement of the loops may be obtained. If the background shape is limited by the usual conventional rectangle around the 9 or even by a composite shape produced by superimposing aligned characters then part of the displaced 6 will fall outside the area observed. This area does not fit the 9 and by neglecting it the discrimination will be reduced. However, if the conventional rectangular boundary is extended so as to include all such areas difficulty will be experienced because adjacent characters and unwanted masks will be observed unnecessarily. What is proposed, therefore, is that the area observed should be limited substantially to that occupied by the characters in their aligned state together with those misaligned characters which would otherwise give poor discrimination.

For example, in the present arrangement it is necessary only to consider vertical misalignment so that in this application the composite area would be obtained (a) by superimposing all characters in the aligned state,
(b) by slightly extending the area all round to allow for ink spread,
(c) by extending the area vertically to include the misaligned positions of those characters in which the discrimination would otherwise be unacceptably low. This must be done so as to optimise the performance, balancing the possibility of insufficient discrimination against misaligned characters against the increased possibility of observing unwanted masks as the area is increased. The extent to which this is done in practice will therefore depend on individual circumstances.

A further advantage of the pattern recognition apparatus proposed herein results from the fact that the effective signal in each photo-multiplier channel tends to be increased. This increased valve occurs because the significant part of the signal forms a larger percentage of the total and therefore the accuracy of each comparison process is increased. Also, the area covered by each feature mask is reduced, since it corresponds not to a whole character but only to a part of it. The sub-areas therefore tend to pass more frequently from all black to all white as the character moves across the field, and it is therefore possible to use some of these sub-areas to provide information about the contrast of the print for automatic gain control purposes. It is also an advantage in some circumstances to remove the "D.C. component" of the mask signals and with the small areas this is easily done by suitable A.C. coupling. Because each character is divided into features or sub-areas from which separate signals are available and because these, if chosen in accordance with the method described herein, represent significant differences, it is possible to achieve greatly improved discrimination by the use of the following "decision area" technique which will now be described.

According to this technique the signal representing the whole character is built up as described earlier, but it is used mainly for primary discrimination. It may well be possible to separate completely using these signals, and in fact this will usually be so where the difference between fact this will usually be so where the difference between the pattern is great; however, where the difference is small, it is very effective to supplement this by the use of additional signals from certain masks or even combinations of masks chosen to represent decision areas. In effect the main signals are then used to determine in which group of similar characters the unknown is included. Having determined that the unknown is one of a given group, and not any of the others or a smudge on the paper, discrimination within the group is made by observing decision area signals. Thus, for example, the apparatus shown in FIGURE 1 can be employed to indicate that an unknown character is a "3" or a "5" and not any of the other character numerals of the group, such as 0, 1, 2, 4, 6, 7, 8 or 9. This partial identification can be made because the maximum output from the channels respectively representing the combination of elemental features which form a "3" and a "5" are larger than the maximum output obtained from any of the channels representing other numerals of the group. Referring to FIGURE 2, it is seen that the numeral 5 is represented by the elements F+G+J with the elemental area H unfilled, whereas the numeral 3 is represented by F+H+J with the elemental area G unfilled. Thus, the difference in the magnitudes of the signals obtained from the channels representing the characters 3 and 5 is small and difficulties in discriminating between such characters may thus be encountered. However, after establishing that the unknown character is either a "3" or a "5," the outputs of the individual masks respectively representing the feature elements H and G are examined. If the output obtained from comparison involving the mask representing feature H is larger than that obtained from comparison involving the mask representing feature G, the unknown character can be identified as a 3. However, if the maximum output from mask G is larger than that from the mask H, the unknown character can be identified as a 5. The evaluation of the significance of the relative levels of the outputs obtained from the masks H and G is carried out in one example, by providing a discriminator to observe whether the signal from area G is larger or smaller than that from area H. Since the elemental areas H and G are highly significant in the identification of a character within a group of similar characters, such areas will be referred to as decision areas. By using the decision area technique, the observed differences are always kept large, both in the coarse observation to decide the character group and the fine examination to decide on the character and hence it is not necessary to measure small differences between large quantities in order to identify a character.

The use of distributed masks has the further advantage that the summation of sub-elements can, if desired, be weighted according to significance. Thus, if the signals representing whole characters are built up by summing resistors, the weighting can easily be introduced by appropriate choice of resistor. With the whole mask method this is difficult, since it involves weighing the transparency, whereas only clear and opaque areas are required according to the method proposed herein.

In a further example of pattern recognition apparatus, according to the present invention, the signals which are derived to enable a character to be identified are not restricted to signals representing degrees of match and mismatch between mask and the character, but also include signals representing the rate of change of these quantities. Such signals can also be employed in conjunction with pattern recognition devices which represent complete character masks, but the use of distributed masks renders the employment of such signals particularly advantageous. Such rate of change signals can be derived, for example, by applying the signal, resulting from the comparison of an unknown character with a mask representing an elemental feature, to a differentiating circuit. The application of such rate of change signals to pattern recognition devices will now be described in detail. An element such as A, see FIGURE 3, would be "black" for the character "8" but would normally be "white" for a character "0," and this difference might be supposed to form a distinguishing feature. However, if the centre of the character "0" were filled with ink, area A would be "black" for both characters at the instant of correct match, and the areas would give no discrimination. But the difference between the "8" and the "0" would still exist for a human observer, because he would observe that the black in the "8" was part of a central bar whereas the black in the centre of the character "0" was not. This could also be detected by a pattern recognition device by adding other small areas such as B and C at each side of A, but this is inconvenient. Such a method is also unreliable, since the areas must be close to A and so would easily be filled with ink if the inked area spread. According to the method proposed, however, a signal representing the rate of change of black in elemental area A is also examined, since the maximum of this waveform will separate the bar in the character "8" from the filled character "0," providing suitable rates are chosen. The additional elemental areas B and C are not then required.

Rate of change signals are also of value in many other circumstances, for example, in separating the curved and straight top contours of the "five" and "eight," see FIGURES 2 and 3. This separation can, of course, be attempted by comparing the areas D and F to determine which of these is most nearly "black" and this approach is usually quite satisfactory. However, if very severe ink spread is present it is possible for both areas to be substantially filled and the above test will fail to provide the desired distinction.

Even under these conditions, however, the edges of the pattern will still be characteristic, for example, the edge of the area F will still fit the straight edge at the top of the five better than will the curved edge of area D. As the image of the character sweeps over the two areas, shown in FIGURES 2 and 3 by the references D and F, the difference in the rate of change from white paper to black ink, for example, can be utilised, by suitable choice of values, to provide distinguishing signals. If the character is a "five" then the transition signal from area F will be higher than that from D and this will hold for high and low contrast ink and be little effected by ink spread.

Although only the use of derivatives and partial derivatives of the main signal has been described above, other sets of signals, namely functions of the main signals, can advantageously be employed in the matching process.

The distributed mask technique has been described above with reference to a multiple optical correlation device is particularly suited to such devices. However, the present invention is not restricted to such optical devices since the method of employing masks to represent only parts of a character can be applied to electron optical devices and to other non-optical pattern recognition devices.

Although the pattern recognition devices which have so far been described herein employ analogue signals to provide a measure of correlation between an unknown character and a mask or group of masks, digital signals can also be employed. When a digital binary technique is adopted, the elemental features of characters are quantised as "black" or "white," that is given a specific value, in accordance with whether the signal obtained from the comparison process involving each feature is above or below a specific or mean level. The apparatus employed in conjunction with such a digital technique is similar to that which has been described hereinbefore, except that the number of elemental features into which the characters are divided is larger in general, than is the case when analogue techniques are used. Thus, an elemental area such as that shown by the reference J of FIGURE 2 may be divided into five or six smaller sub-areas when a digital technique is employed. In order to quantise the signals derived from each elemental mask it is necessary to establish a main background signal level which serves as a quantising criteria. Such a level may be determined, for example, by employing peak detectors to observe the values of the maximum positive and negative excursions which occur as the image of an unknown character is deflected across the mask representing an elemental feature, the mean of such excursions can be employed to establish a mean level. If a binary digital notation is employed, a correlation signal is allocated a significance "binary 0" if its value falls below the mean level, and "binary 1" if it exceeds the mean level. Alternatively, a ternary notation could be used by allocating significance on the basis of three levels. Thus, the signal will be either below the mean level by a predetermined amount, above the mean level by a predetermined amount, or at or near the mean level within a predetermined amount.

An alternative embodiment in accordance with the present invention utilises electrical circuit representations of masks instead of actual optical masks, and will now be described with reference to FIGURE 5 of the drawings.

With reference to FIGURE 5 of the drawings, reference numeral 1 indicates an input device comprising a photoelectric cell which is arranged to scan the unknown pattern to produce an output characteristic of that pattern. The scan in this example is according to a television type raster. The output signal of the device 1 is supplied through an amplifier 2 and an input transducer 3 to a magnetostrictive delay line 4. If the scan is performed in the manner of a television raster, with movement of the pattern constituting the low frequency scan, the line 4 is preferably long enough to correspond to one complete scan pattern. It may be composed of sections each of a length the traverse time of which equals one line of the high frequency scan separated by delays equal to the flyback time. Clearly, these lengths can also be connected in the form of a continuous line. Alternatively, as will be apparent hereinafter, the length of the line may only be sufficient to include combinations of pattern points capable of constituting distinctive pattern features. Of course, a conventional delay line could be used instead of the magnetostrictive delay line illustrated, in which case analogue information could easily be stored in the line. This could be quantised at each tapping point to provide the binary signals used in FIGURE 5 or alternatively full use could be made of the analogue information by the modified scheme described hereinafter. Pick-up coils **4*a* are distributed along the delay line 4 and produce outputs whenever a pulse travelling along the delay line 4 passes their locations, so that a changing pattern of pulses is picked up by the coils as the signal from the amplifier 2 travels down the delay line. Clearly, the location of the coils 4*a*** may be adjusted.

The output from each coil **4*a* is amplified by an individual amplifier 5 and applied to a rectifier 6. The rectified signal is then caused to modulate a reference oscillation in the appropriate phase modulator 8 and applied to the primary winding of a transformer 9 in such a way that the phase of the modulated signal is either in or out of phase with a phase reference voltage applied from terminal 7 to the modulator 8, depending on whether the amplitude of the signal picked up by each coil 4*a* is less or greater than a given value. In the present embodiment only six coils 4*a* are shown, and hence there are only six transformers 9, but it must be understood that in practice many more coils will normally be used. For example, it has been found that to separate the ten numerals the minimum number of samples with one organisation is about seventeen assuming they are not mutiliated. Each transformer 9 has many secondary windings (five being visible in FIGURE 5) and moreover that the secondary windings of the transformers are connected in series circuits 10, each series circuit providing the equivalent of a pattern mask of FIGURE 1, and thus corresponding to a pattern feature. In each series circuit 10 some of the secondary windings are connected with one polarity and the remainder are connected with the opposite polarity, the particular configuration being different for every series circuit according to the pattern features represented. In this way the electromotive forces generated across the secondary windings in a particular series circuit can occur all with the same phase, only when a particular configuration of discrete signal elements occurs on the primary windings of the transformers 9. Thus at any one instant, a particular series circuit should have produced across it an electromotive force of a given polarity, exceeding the electromotive forces generated across all other series circuits. As indicated in FIGURE 5, the series circuits 10 including the secondary windings of the transformers 9 are grouped together, the circuit of each group being connected via diodes 11, 12 . . . to a common point. The series circuits connected to any one common point correspond to a single predetermined pattern, each series circuit representing a feature of that predetermined pattern. Thus, in the FIGURE 5 arrangement there is the equivalent of a separate group of feature masks for every individual predetermined pattern and as a character is sensed by the photocell 1, the series circuits of one particular group should successively have generated across them the greatest electromotive forces. Again simplification has been adopted in the drawing, and only two series circuits are indicated as being connected to each common point. In practice, the transformers 9 have toroidal cores and the secondary windings of the series circuits are produced by lacing each wire through each toroidal core of the transformer 9** in one of two ways. Either the wire passes first over the left side and under the right side of the toroid or vice versa. Thus each series circuit may be built up by a single laced wire.

From each junction point of diodes 11, 12 there proceeds a single sense circuit or wire including primary windings of transformers 14. The direction of lacing of these primary windings is such as to form an output code, so each series of primary windings is laced in a different manner from the others. In the present arrangement it can be seen that with three transformers 14 it would be possible to have eight differently laced series of primary windings representing eight patterns, though again in the interest of simplicity only five are shown.

As stated, each of the secondary wires 10 of the transformers 9 associated with a single primary wire of the transformers 14 is laced to correspond to a feature which will appear on the delay line 4 at some moment during the sensing of one particular pattern. The secondary wire 10 of the transformers 9 which most closely resembles the feature produced upon the delay line 4 at any one moment will produce the highest output on the appropriate diode 11 which in turn will tend to cut off all the other diodes 11, 12 . . . as the primary windings of transformers 14 are all connected to a common point of D.C. potential on the potential divider 13, the signal being decoupled by capacitor 19. Inevitably, during sensing, due to variations in the form of patterns an occasional response will occur in one of the secondary wires 10 of the transformers 9 which is connected to a primary wire of the transformers 14 to produce an output code other than the correct code for the unknown pattern.

As each of the transformers 14 will produce a signal representing one bit of a binary code, there may therefore be one, two or three incorrect values fed to amplifiers 15 from signals on an incorrect primary wire but clearly with a normal pattern which is not unduly mutilated, a preponderance of signals will occur on a single primary wire common to a set of primary windings of the transformers 14. The signals from the secondaries of transformers 14 will bear a constant phase relationship to one another, and a D.C. binary output code is produced by relating the phase of these output signals to the phase of a reference voltage produced in transformer 21 and amplified by amplifier 20, in a phase conscious detector 16. Thus, positive or negative pulses are produced and applied to counters 18, which can count either "up" or "down." In the present embodiment, these counters take the form of "cup and bucket" circuits, and are arranged to produce an output only when the counter has reached a predetermined level. A "cup and bucket" circuit is the name given to a charge transfer counting circuit in which a small condenser is charged to a constant extent and this constant amount of charge is transferred via a diode to a larger reservoir condenser each time a pulse occurs which it is desired to count and the voltage on the reservoir condenser is indicative of the number of pulses counted. The counter may also be made to work in the reverse sense when required, in which case the small "cup" condenser is caused to extract a constant amount of charge from the reservoir or "bucket" condenser at each occurrence." A suitable number of steps separates this level from the starting level, in the present arrangement sixteen consecutive pulses of the same sign are required to drive the counters 18 from one end to the other. Thus, if after ten pulses of one sign one pulse of the opposite sign occurs, a further seven pulses of the original sign will be required before the output from the particular counter may be accepted. Further, a system of gates is provided, but not illustrated as they may be of any form well known in the art, to ensure that all the counters have reached their end before the final output code is accepted.

In order to distinguish a pattern which occurs twice and adjacently, another binary bit may be added to the output to indicate whether the responses from the input device 1 comes from the front or back of the pattern. The terms "front" and "back" are taken to mean the portions of the pattern which are seen earlier or later by the sensing device. For a pattern to be read by the machine the front and back must be seen in the right sequence as indicated by the output bit.

Although the input device 1 includes a photo-electric cell it must be understood that other arrangements are equally satisfactory. Neither must it be assumed that a magnetostrictive delay line is a necessary part of an input arrangement for a pattern recognition device in accordance with the present invention. As an example, another suitable input arrangement can take the form of a series of photo-electric cells viewing the output of an image convertor tube through a single lens, or through a number of selected masks each working on the image thrown by a separate lens, or through a number of masks on the same lens, the input to the tube being derived by scanning the pattern to be recognised.

If a machine is to respond to more than one type face, and most especially if it is to respond to patterns of different sizes, considerable complexity may be involved in the threading of the secondaries of the transformers 9, and an alternative form of the invention with a view to reducing this difficulty is illustrated with reference to FIGURE 6.

In FIGURE 6, references 19 and 21 show in block form two units of the type described with reference to FIGURE 5 and illustrated below the dotted line A—A and serve as information sorters. All the comments regarding input unit 1 which is connected to device 18 which were applied to FIGURE 5 apply equally in this case. Block 18 may conveniently comprise once again a delay line, but the first sorter 19 is set up to respond to components of each pattern to be recognised and preferably to components which will not be altered by considerable variations in size of the pattern. Such components may conveniently be edges, curves or corners for example. The lacing of the transformers which would correspond in block 19 to the transformers 9 in FIGURE 5 are laced to observe a particular sub-feature or component of a pattern, while the output from the device operates two-state devices 20 which serve to store the output of the device 19 representing major features. The second sorter 21 which is similar to 19 in construction is laced to respond to a combination of characteristics or features of a pattern by observing the codes as they are represented in succession in the 2-state devices 20. In one practical case the unit 19 produces outputs derived from combinations of pairs of pattern sub-features, but more than two sub-features may be involved. In this latter arrangement, a pattern is not recognised on the basis of the same feature which occurs twice in the same pattern, and therefore the features chosen should be sufficiently complex to ensure that they do not occur twice in any one of a number of patterns to be recognised. Clearly other arrangements are possible in which this restriction is avoided, for example the fact that features have occurred more than once could also be recorded. From the foregoing it will be obvious that many more outputs than the four which are illustrated will be provided from the sorter 19. The output from sorter 21 which is present when all the counters reach their ends as hereinbefore described with reference to FIGURE 5 produces a signal which clears the 2-state devices 20 through conductor 22 after the recognition of each pattern. The output however need not be the coded name of the pattern but may be applied to yet another sorting device such as 19 and 21 in which case 19 could be presented with very simple shapes which would be built up by the sorter 21 into more complex combinations of shapes and passed for identification to a final sorter whose output produces the coded recognition signal. An alternative arrangement would clearly be to arrange two information sorters to observe patterns in parallel, both of which could then feed a third sorter. Various other modifications will, of course, be readily conceived by those skilled in the art.

As noted above with reference to the multi-stage machine described characters of varying size must have information derived from them which is not substantially dependent upon size variation. A suitable arrangement of photo-cells is shown in FIGURE 7 whereby a detection of edges and curves may be made. By providing circuits responsive to which cells are light and which are dark, means are provided for detecting black-white edges along *a—a*, *b—b* or *c—c* and it can similarly be seen that a black-white edge at *x—x* could also be detected. Most particularly, edges such as these would be detected independently of their lengths, provided that the size of the group of cells is small compared with the length of the edge. The group of cells must, however, not be so small as to generate false patterns arising from irregularities on the edges of relatively large patterns. In a modified practical arrangement to deal with very large changes of size further concentric rings of cells are disposed around those shown in FIGURE 7, with logical circuits to feed the output from the ring of cells more distant from the centre only if they are in agreement with the adjacent ring which is closer to the centre, Similarly, the diameter of the cells may be reduced with the diameter of the ring. In this way, the smallest group will automatically be used for the smallest parts and consecutively larger and larger groups will be used as the pattern size increases.

A further precaution which has the advantage of emphasising the edges would be to designate cells either black or white by comparing the output of each individual cell with the mean output of all the cells in use.

In the foregoing description of FIGURES 5, 6 and 7 it has been assumed that the coded input information used in the pattern sorting and recognition devices is in a given only binary significance. This is not, however, a necessary restriction, and indeed, analogue input signals may be treated as analogue signals with advantage in certain circumstances. For example, the signal input can be represented by an analogue quantity which has a maximum for an all black area, through zero to a maximum of the opposite sign for an all white area. This signal is then used to amplitude modulate a carrier whose phase is reversed through 180° when the sign of the input is changed. The modulated carrier may then be applied to the primary windings of transformers whose secondaries are summed in series exactly as in FIGURE 5 to obtain a maximum output from the secondary winding which best agress with the input at any one time. Clearly, areas of the pattern which are of uncertain value, for example, edges which may be deformed, will be represented by smaller values of analogue potential while more certain areas within the body of the pattern or outside the scope of the pattern will have high values. This variation in values will automatically mean that weight is given, in recognition, roughly proportional to the reliability of areas of the unknown character. Similarly, the fact that no limitation is made to one of two states as is the case of binary coded input information means that additional information is available.

Alternatively a full analogue system may be used throughout, and an analogue device will now be described with reference to FIGURE 8 of the drawings. The figure is complete only with regard to a single sampling point, and it must be realised that many such sampling points will be necessary for the recognition of actual patterns, the connections of the other devices associated with other points being between the parallel chain-dotted lines in the figure, each including all the parts shown outside the dotted lines with the exception of the units 112, two of which are shown, and the terminals 114–118 inclusive. The term "sampling point" as herein used is to be taken to mean a particular area of a pattern which will not in practice be a point as normally defined.

A signal is applied to the terminal 101 from an input device responsive to the configuration of a pattern and may take several forms. If the signal from a pattern is derived by scanning the pattern with a television type scan, as the pattern is moved relative to the scan a continuously varying input signal will be applied to terminal 101 which signal will have relevance at one period during the scan when the point on the pattern which is to constitute the sampling point appropriate to that terminal is encountered in the correct position of the scan.

A number of input terminals like terminal 101 represent other sampling points which receive input signals according to the scan. These signals may each be selectively delayed so that corresponding elements of the signals at all sampling points, including 101 occur simultaneously. Consequently, as will hereinafter become clear, although at some other time during the scan signals of extreme value may occur at various times on the different terminals like 101, it is only when a specific combination of input signal occurs that a decision as to the identity of the pattern is relevant.

An alternative arrangement for deriving information from a pattern may take the form of an optical mask or masks through which the patterns are sequentially viewed by photo-electric cells. The pattern is then moved relative to the masks and cells so that the outputs of the cells will vary, but these cells will, at one particular moment when the pattern is located in a predetermined position, produce outputs having maximum significance for recognition purposes. Clearly the actual value of the outputs will depend upon the proportion of dense and less dense parts of the character "seen" by each cell through its mask.

The input at terminal 101 is applied to a differencer 110 where it is compared with a fixed reference voltage applied to terminal 102 and the difference passed to modulators 103 and 104. Modulator 103 is arranged to produce a modulated carrier output, the amplitude and phase of which vary. The amplitude indicates the difference between the input signal and the reference voltage, while if the input signal falls below the reference voltage, the phase of the modulated output changes by 180 degrees. An output from the modulator 103 is applied to the modulator 104 and also to the units 105. Also applied to the modulator 104 is the output of the differencer 110 so that the output of the modulator 104 represents in amplitude and phase the square of the aforesaid difference between the input signal and the reference voltage. For convenience the input signal after differencing bears the reference $a_{01}$, the suffix 1 indicating that the signal refers to the first sample point, the $a$ signifying that it is directly related to the pattern and the first suffix 0 that it is a sample value, to distinguish from a stored pattern value in which the first suffix is 1.

The signal from the modulator 104, which is $a_{01}^2$, is passed to a multiplier 111, which multiplies this term by a large constant value $C_3$. This constant is always negative. The output of the multiplier 111, $a_{01}^2C_3$, is applied to an adder 112 which also receives a constant voltage supply on terminal 119 the purpose of which is to facilitate the comparison of voltages on the output terminals 114 to 117 by making them positive so that the maximum voltage is not, as would otherwise be the case, zero. This results will be seen from the description of the principles underlying the device, which is included hereinafter. Two other inputs are shown connected to two adders 112. They are $a_{02}^2C_3$ which will be the squared output of a differencer and modulator in the second sample position multiplied by $C_3$ and $a_{0n}^2C_3$, the corresponding output of the $n$th sample position. There are of course as many adders 112 and inputs as there are sample points. All the terms $a_{01}C_3$, $$a_{02}C_3 \ldots a_{0n}C_3$$

are summed and the total appears on conductor 113 where it is split into a number of series circuits or paths. The actual number of these paths shown is five, but in practise there will be as many as there are predetermined patterns which can be identified, plus one test path. Each path is connected to an output terminal through a series of pairs of adders similar to the adders 106 and 107 shown in the figure. To the adders 106 are applied constant term $C_{21}$, $C_{22} \ldots$ multiplied by the input signal $a_{01}$, while to the adders 107 are applied signals of stored values $a_{11}^2$, $a_{12}^2 \ldots$ multiplied by a constant $C_3$. The other adders like 106 in any one series path apply to the respective path the input signals $a_{02} \ldots a_{0n}$ multiplied by other constants $C_2$. The constants $C_2$ differ from input to input also from series path to series path. The adders like 107 in any series path apply to the respective path, the constant term $C_3$ multiplied by stored signals like $a_{11}^2$, these signals also differing so that there is one for each input signal $a_0$. The multiplications are affected in multipliers 105 and 108, and other similar multipliers for the other input signals. The actual values of the $C_2$ terms and the $a_1^2$ terms, different for every pattern, may be set up by reference to a known test pattern at each sample position in the following manner. There is one pair of test multipliers for each pair of columns of multipliers 105 and 108. A known pattern is scanned, and preferably rendered stationary with respect to the sample points. The ganged controls on multipliers 105 and 108T are then set up to give maximum output from terminal 118, and the corresponding controls for the pairs of multipliers are similarly adjusted in succession. The values on the test multipliers may then be transferred to those of the multipliers 105, 108, etc., which affect the output on the particular one of the terminals 114 to 117 which is to correspond to the particular pattern presented. If this is then repeated for another pattern to produce a maximum output an another terminal, it will be possible to recognise two patterns. It must be understood that all the patterns to be recognized are set up in this way. Alternative methods of deciding the values of $C_2$ and $a_1^2$ to store will be apparent to one skilled in the art, and the method hereinbefore described serves only as an example.

The multipliers 105 and 108 etc. in the example being described comprise transformers in which case the turns ratios govern the multiplication factors, and the provision of tapped windings will permit this ratio to be adjusted as desired. The adders 106 and 107 are realised merely by connecting the secondaries of the transformers in series in each series path to add to the sum of the $a_0^2C_3$ terms and to produce outputs on the separate output terminals 114 to 118. Thus the multipliers 105 as illustrated in the figure consist of a transformer having its primary winding connected to the output of the unit 103, and five tapped secondaries respectively connected into the paths associated with terminals 114 to 118 inclusive.

The principle of the present embodiment is more clearly seen when the inter-relationship between the various values is defined. If the term $a_1^2C_3$ is given the alternative designation of $C_1$ it will be apparent that the output for a particular pattern with respect to one sample will be $$C_1+a_0C_2+a_0^2C_3$$

The total score comprises the sum of the contributions of each sample point to the output due to different samples so that in each case the values of $a_0$, $a_1$ and $C_2$ will be different. $C_3$ determines the degree to which the score is reduced for a given deviation from the correct value and can have a fixed value.

If $f(A_o)=C_1+a_0C_2+a_0^2C_3$, then $$f'(A_o)=C_2+2a_0C_3$$

For a maximum output to occur at a particular value of $a_0$, for example when $a_0$ is equal to $a_1$, then $f'(A_o)=0$. In this case $C_2=-2a_1C_3$.

If $f(A)$ is required to contribute a certain score when A is correct, for example a score of 1, then $$C_1+a_1C_2+a_1^2C_3=1$$

and $$C_2=-2a_1C_3$$

So that $$C_1-a_1^2C_3=1$$
$$C_1=a_1^2C_3+1$$

Note that $C_3$ is always negative.

Since the scoring system is only comparative, then 1 in this example is also present in the corresponding sample on any other pattern with which comparative scores are concerned, so that it may be ignored without affecting the result of the comparison.

So for each input sample there are two values to be stored to set up a particular predetermined pattern:

$$C_1=a_1^2C_3$$

and $$C_2=2a_1C_3$$

Thus it will be seen that the $C_2$ and the $C_1$ terms are related, and hence the advisability of ganging the test controls such as **105*t* and 108*t*** to maintain their inter-relationship.

From the above it will be seen that for correct recognition, $$C_1+a_0C_2+a_0^2C_3=a_1^2C_3-a_0(2a_1C_3)+a_0^2C_3$$

and when $a_0=a_1$ the sum of the terms is zero. For any other value of $a_0$, the result is less than zero. Hence the provision of the potential on terminal 119 which will be added to all the outputs equally. The particular terminal 114, 115 . . . which gives the greatest output at any time during the sensing of a pattern can be identified in one of the ways already indicated.

Although the foregoing arrangement operates on the basis of assessing similarity on the square of the difference between stored and sampled value, it can clearly be modified in many ways. One example would be to assess similarity on the difference between the values themselves, which can be seen to be an even more direct analogy of the arrangement shown in FIGURE 5. Moreover, the alternative arrangements of the binary system referred to with reference to FIGURE 5 may equally be applied to the above analogue variation.

Many other variations will be apparent to one skilled in the art, and the above described embodiments serve only to illustrate a number of practical devices. For example, in an arrangement such as shown in FIGURE 5, thin film anisotropic magnetic elements may provide couplings such as provided by the transformers 9, the couplings being made phase sensitive by using the technique described for example in the granted British Specification No. 975,016 in the name or Electric & Musical Industries Limited.

What we claim is:

1. A pattern recognition device comprising sensing means for producing from a pattern area a series of pattern feature correlation signals which represent respectively the degree of correlation of a pattern in said area with a series of pattern features, means for producing the effect of displacement of the pattern area relative to each of said series of features, comparison devices for combining said correlation signals in different combinations to produce corresponding comparison signals, coupling means for applying the pattern feature correlation signals to the said comparison devices and output means for detecting which combination of pattern feature correlation signals has produced the extreme value of said comparison signals after a predetermined amount of relative displacement thereby to indicate which combination of said pattern features is most nearly exhibited by the pattern in said area in different positions thereof relative to said features.

2. A device according to claim 1 in which said sensing means includes means for producing from a pattern area at least one further signal which depends more on the presence of discontinuities in the pattern than on the areas of uniform intensity, said further signal being applied with said pattern feature correlation signals to said comparison devices.

3. A device according to claim 1 in which said sensing means includes means for producing from a pattern area at least one further signal which depends on the rate of change of pattern feature correlation signal with displacement, said further signal being applied with said pattern feature correlation signals to said comparison devices.

4. A pattern sensing device according to claim 1 in which said output signals are applied to another pattern recognition device, so that pattern recognition occurs in two or more stages.

5. A device according to claim 1 wherein said sensing means and said coupling means are such that said pattern feature correlation signals, occurring simultaneously, are applied in parallel to said comparison devices.

6. A pattern recognition device according to claim 1 in which said sensing means comprises another pattern recognition device, so that pattern recognition occurs in two or more stages.

7. A pattern recognition device according to claim 1, in which said comparison devices comprise correlation networks and each correlation network comprises means for comparing said pattern feature correlation signals with a predetermined group of values to select the correlation network giving the maximum degree of correlation.

8. A device according to claim 7, wherein each correlation network is such as to form a signal representing the square of the difference between the values of said discrete signal elements and the respective groups of predetermined values, said output means being responsive to a signal of extreme value from said correlation networks.

9. A device in accordance with claim 1 in which said output means is such that said extreme value of said comparison signal must exceed a predetermined value before an output signal is produced.

10. A device according to claim 9 in which said output means includes a correspondence counter and wherein said counter must achieve a predetermined level before said output signal is produced, means being provided to reduce said counter level in response to each incorrect correspondence.

11. A pattern recognition device comprising sensing means including a plurality of masks conforming respectively to predetermined pattern features whereby said sensing means produces from a pattern area a series of pattern feature correlation signals which represent respectively the degree of correlation of a pattern in said area with a series of pattern features, means for producing the effect of displacement of the pattern area relative to each of said series of features, comparison devices for combining said correlation signals in different combinations to produce corresponding comparison signals, coupling means for applying the pattern feature correlation signals to the said comparison devices and output means for detecting which combination of pattern feature correlation signals has produced the extreme value of said comparison signals after a predetermined amount of relative displacement, thereby to indicate which combination of said pattern features is most nearly exhibited by the pattern in said area in different positions thereof relative to said features.

12. A device according to claim 11 wherein said image is moved about with respect to said masks to ensure correct registry of the image with respect to the masks at least one instant despite indeterminancy as to the position of the pattern being sensed, said individual signals being liable to vary during the moving about process, and wherein said output means includes storage means to store the indication of said particular arrangement, irrespective of the time of occurrence of the greatest number of correspondences during the moving about process.

13. A device according to claim 11 in which said masks are optical feature masks.

14. A device according to claim 11 in which said masks include positive masks and negative masks to detect the presence or absence of features in the pattern to be recognised.

15. A device according to claim 11 comprising means for weighting the pattern feature correlation signal derived from selected special significance masks so that an output indicative of certain arrangements of features can only be produced if there is correspondence as to one or more special significance features.

16. A pattern recognition device comprising sensing means for producing from a pattern area a series of pattern correlation signals which represent respectively the degree of correlation of a pattern in said area with a series of pattern features, means for producing the effect of displacement of the pattern area relative to each of said series of features, comparison devices for combining said correlation signals in different combinations to produce corresponding comparison signals, coupling means for applying the pattern feature correlation signals to the said comparison devices wherein said sensing means and said coupling means are such that pattern feature correlation signals, occurring in sequence are applied in parallel to said comparison devices and output means for detecting which combination of pattern feature correlation signals has produced the extreme value of said comparison signals after a predetermined amount of relative displacement, thereby to indicate which combination of said pattern features is most nearly exhibited by the pattern in said area in different positions thereof relative to said features.

17. A device according to claim 16 wherein said sensing means includes combining means for deriving said pattern feature correlation signals from combinations of discrete signal elements representing sample points on the pattern to be recognised.

18. A device according to claim 17, wherein said combining means includes means for producing pattern feature correlation signals each of which comprises a group of discrete signal elements having different values to indicate the relative degree of presence or absence of pattern at sample points.

19. A device according to claim 17, wherein said combining means are such that said discrete signal elements comprise oscillations of one of two phases indicating relative degrees of presence or absence of pattern at each individual sample point.

20. A device according to claim 19 in which each correlation network includes means for producing a signal representing the sum of said discrete signal elements after subjecting said elements to selected phase shifts.

21. A device according to claim 20 wherein each correlation network comprises an arrangement of transformers having their secondary windings connected in series.

22. A pattern recognition device comprising means for sensing a pattern to derive individual signals therefrom representing different pattern features, a series of comparison devices which correspond respectively to a series of predetermined different arrangements of pattern features, coupling means including delay means for applying in parallel to said series of devices, said individual signals which occur in sequence so that the arrangement of pattern features represented by the derived signals is compared for correspondences with every one of said predetermined arrangements of pattern features and wherein said comparison devices comprise correlation networks such that every correlation network is liable to produce an output signal, inhibiting means whereby the extreme output signal from a particular correlation network inhibits an output signal from any other correlation network, and output means responsive to said devices for producing an output signal which indicates the particular one of said predetermined arrangements of pattern features which yields the greatest number of correspondences with the pattern features of the sensed pattern.

23. A device according to claim 22 wherein each comparison device of said series comprises a combination of correlation networks individual to that device.

24. A device according to claim 22 wherein the sensing means includes combining means for deriving said individual signals from combinations of discrete signal elements representing sample points on the pattern to be recognised.

25. A device according to claim 22 wherein said output means includes a correspondence counter and means responsive to the total in said counter to produce said output signal after said counter has achieved a predetermined total and means are provided to reduce the count in said counter in response to each incorrect correspondence.

26. A device according to claim 22 in which there are provided a plurality of storage means for storing said correspondences and a further series comparison devices which correspond respectively to a series of predetermined different groupings of stored correspondences each of which produces a comparison signal indicative of the arrangement of said stored correspondences in the respective groups, coupling means for applying the outputs of said storage means to said further series of comparison devices so that the arrangement of correspondences represented by the stored signals is compared for correspondence with every one of said predetermined arrangements of stored correspondences, and further output means for detecting which grouping of stored correspondences has produced an extreme value of said comparison signals thereby to indicate the particular one of said predetermined arrangements of stored correspondences which most clearly corresponds to the sensed pattern.

References Cited by the Examiner

UNITED STATES PATENTS

| | | | |
|---|---|---|---|
| 3,085,227 | 4/1963 | Brown | 340—146.3 |
| 3,104,369 | 9/1963 | Rabinow | 340—146.3 |

MALCOLM A. MORRISON, *Primary Examiner.*